United States Patent
Topsøe et al.

(10) Patent No.: US 7,138,094 B2
(45) Date of Patent: Nov. 21, 2006

(54) REACTOR FOR CATALYTIC TREATMENT OF A PARTICLE-CONTAINING GAS

(75) Inventors: Haldor F. A. Topsøe, Vedbæk (DK); Hans Jensen-Holm, Virum (DK); Ole Ekner, Værløse (DK); Søren Selde Enevoldsen, Espergærde (DK); Max Thorhauge, Herlev (DK); Per Morsing, Vedbæk (DK)

(73) Assignee: Haldor Topsoe A/S, Lyngby (DK)

( * ) Notice: Subject to any disclaimer, the term of this patent is extended or adjusted under 35 U.S.C. 154(b) by 537 days.

(21) Appl. No.: 10/352,024

(22) Filed: Jan. 28, 2003

(65) Prior Publication Data

US 2003/0152499 A1     Aug. 14, 2003

(30) Foreign Application Priority Data

Feb. 8, 2002    (DK) .............................. 2002 00194

(51) Int. Cl.
    *B01J 8/02* (2006.01)
(52) U.S. Cl. ..................... 422/212; 422/213; 422/220
(58) Field of Classification Search ............... 422/144, 422/145, 147, 212, 213, 220; 210/603, 521, 210/522
    See application file for complete search history.

(56) References Cited

U.S. PATENT DOCUMENTS

| | | | | |
|---|---|---|---|---|
| 4,629,552 A | * | 12/1986 | Haddad et al. ............. 208/161 |
| 4,801,432 A | * | 1/1989 | Galiasso et al. ............ 422/143 |
| 5,082,990 A | * | 1/1992 | Hsieh et al. ................ 585/467 |
| 5,455,281 A | * | 10/1995 | Topsoe ....................... 518/707 |
| 5,989,411 A | * | 11/1999 | Gupta ......................... 208/212 |
| 6,046,343 A | * | 4/2000 | Mummey et al. ........... 549/259 |
| 6,296,812 B1 | * | 10/2001 | Gauthier et al. ............ 422/144 |
| 6,309,553 B1 | * | 10/2001 | Lanting et al. ............. 210/802 |
| 6,375,715 B1 | * | 4/2002 | Mauleon et al. .............. 95/108 |
| 6,509,487 B1 | * | 1/2003 | Tatsumi et al. ............. 554/167 |
| 6,554,994 B1 | * | 4/2003 | Reynolds et al. ........... 208/211 |
| 6,626,640 B1 | * | 9/2003 | Ivanovic ..................... 415/142 |
| 2004/0068085 A1 | * | 4/2004 | Belfathel et al. ........... 528/196 |

FOREIGN PATENT DOCUMENTS

| | | |
|---|---|---|
| JP | 52-053764 A | 4/1977 |
| JP | 56-076225 A | 9/1981 |
| JP | 58-006235 A | 1/1983 |

\* cited by examiner

*Primary Examiner*—N. Bhat
(74) *Attorney, Agent, or Firm*—Dickstein Shapiro LLP

(57) ABSTRACT

An up-flow reactor for the catalytic treatment of particle containing gas comprising at least one fixed catalytic bed; at least one drain pipe located upstream of the fixed catalytic bed, the drain pipe disposed within the reactor and a dust rectifier located downstream of the drain pipe and upstream of the fixed catalytic bed.

5 Claims, 3 Drawing Sheets

REACTOR FOR CATALYTIC TREATMENT OF A PARTICLE-CONTAINING GAS

This invention relates to a reactor for catalytic treatment of gas. More particularly, it relates to an up-flow catalytic reactor suitable for removal of particles.

The presence of particles in a gas in catalytic reactors presents a widespread problem. Particles such as dust contribute to erosion and fouling of the catalytic bed. In reactors utilising up-flow systems, larger quantities of dust can collect above the catalytic bed and lead to blockage of the channels in the bed.

It is therefore an object of the invention to provide a catalytic reactor capable of removing particles present in the gas entering the reactor.

This is achieved by the present invention, which provides an up-flow reactor for catalytic treatment of a particle-containing gas comprising a catalytic unit and at least one drain pipe upstream the catalytic unit within a reactor wall.

The reactor is especially suitable for the removal of particles such as dust from exhaust gases from which nitrogen oxides (NOx) have to be removed. It can, however, be used in other processes where there is dust or other solid particles present in the inlet gas stream.

The reactor will be described in more detail below:

Figure 1:
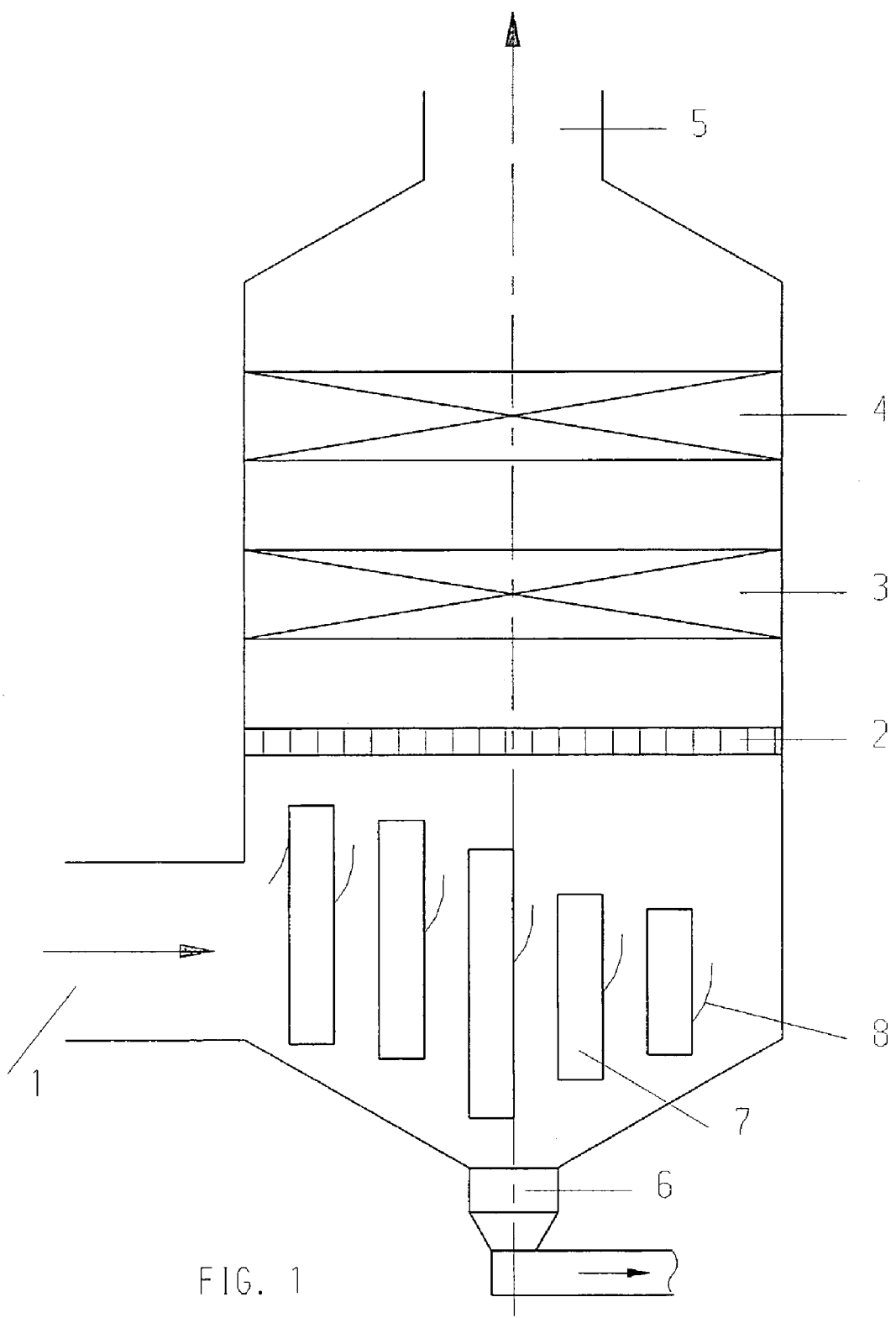
FIG. 1 shows a diagram of a specific embodiment of the invention and the various components.

The reactor is of the up-flow type and has an inlet (1) present at the bottom of the reactor, through which the particle-containing gaseous feedstream enters. Guide vanes (8) can be present at the inlet and inside the reactor to guide the gas in the direction of the catalytic beds. However, they are not essential for the operation of the reactor of the invention, and their presence is therefore optional.

The reactor contains a catalytic unit and the figure illustrates a reactor with two catalytic beds. After passage through the guide vanes (8), the particle-containing gas is directed through a dust rectifier (2) towards the catalytic bed (3). The dust rectifier (2) adjusts the path of the solid dust particles in the gas before entrance into the catalytic bed (3). After passage through the catalytic bed (3), the gas containing a part of the particles enters the catalytic bed (4) and finally leaves the reactor through the outlet (5). The bottom of the reactor has an outlet (6) for collected dust particles. The collected dust particles are then transferred by a transport system to a storage facility.

During its passage through the reactor, the particle-containing gas is present in the reactor void before entrance to the catalytic bed (3). On entering the voids/channels in the bed (3) the dust particles experience an increase in velocity. This is due to the catalytic void velocity of the particles being 1.4–1.5 times larger than the reactor void velocity of the particles. Some of the particles are therefore transferred through the catalytic beds into the reactor void downstream the two catalytic beds (3) and (4), where they lead to fouling and blockage of the catalytic bed as mentioned earlier.

The reactor of the invention contains at least one drain pipe (7) located in the reactor void between the inlet and the catalytic unit. The drain pipe (7) acts as a particle collector and as a drain for the particle. The upper end of the drain pipe is open and this allows the particles to enter the drain pipe for collection. The collected particles drain out of the open bottom end of the drain pipe to the outlet (6) and they are then transported to the storage facility.

In the area around the guide vanes is experienced an amount of gas and particle turbulence. The position of the drain pipes can vary. In an embodiment of the invention the drain pipes can be positioned adjacent to the guide vanes. Placing the upper ends of the pipes adjacent to the guide vanes facilitates the collection of dust in the reactor void upstream the catalytic beds.

In a further embodiment of the invention, where several drain pipes are present, the pipes are placed in the reactor void equidistantly.

Figure 2:
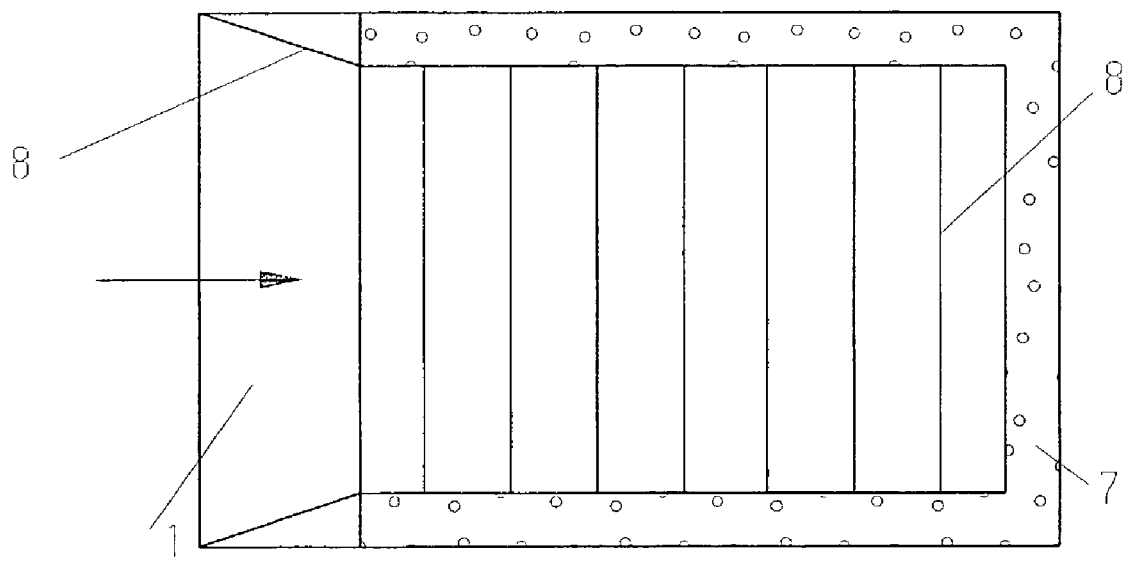

Another embodiment of the invention is represented by replacing a plurality of drain pipes by an internal wall being concentric with and spaced apart from the reactor wall. FIG. 2 shows a horizontal cross-section (viewed from above the internal wall and the guide vanes) of the reactor indicating the position of the internal wall (7). Guide vanes (8) can be present in the inlet and in the reactor.

In the case where the up-flow reactor of the invention is not tubular, the reactor wall comprises a number of sides. The reactor wall shown in FIGS. 2 and 3 comprises four reactor sides.

Figure 3:
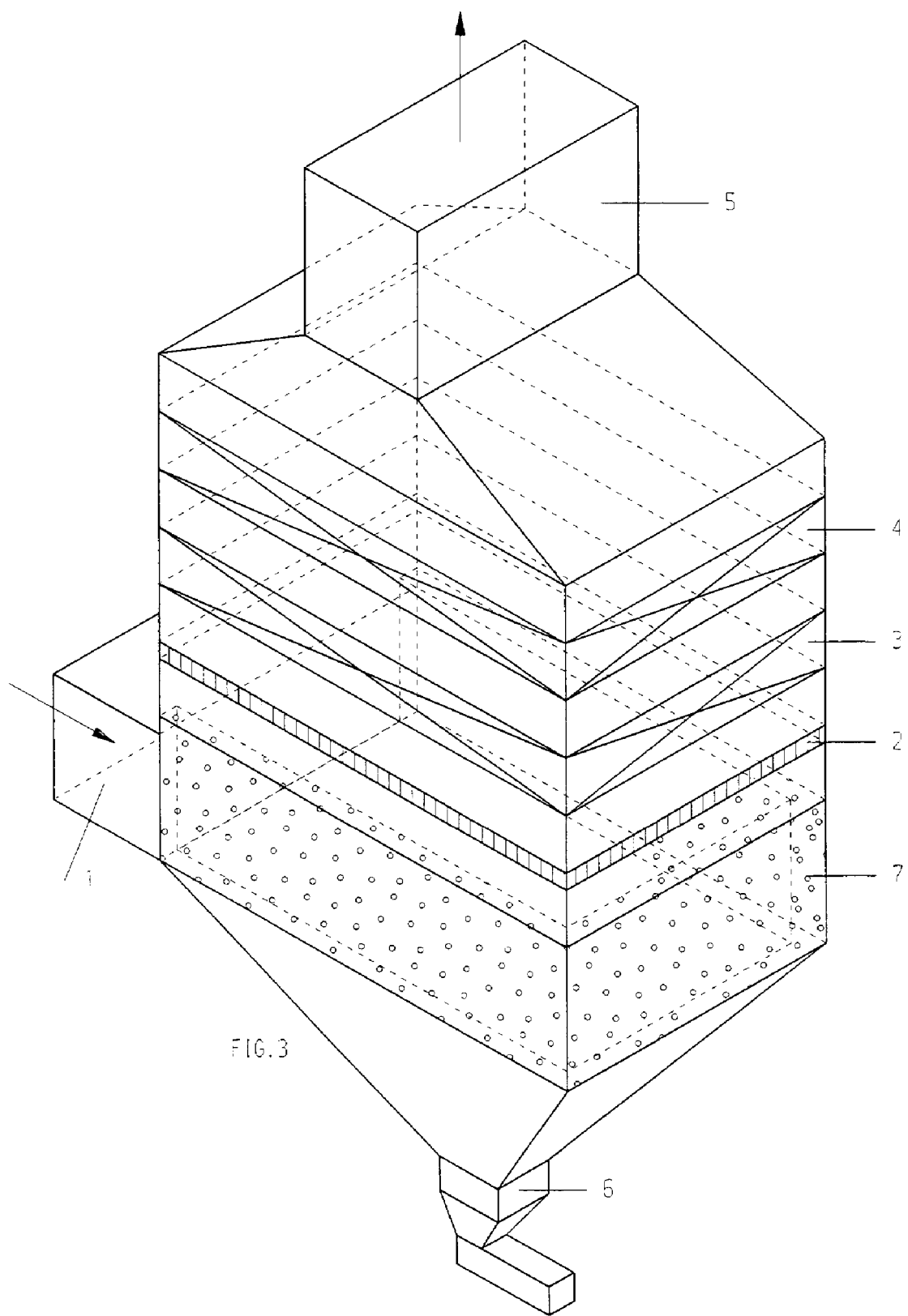

FIG. 3 shows a perspective view of the reactor and the position of the internal wall (7). For clarity the guide vanes are not shown in FIG. 3. The internal wall and the reactor wall form a drain annulus, which is placed between the inlet (1) and the catalytic units (3 and 4). The drain annulus acts as a particle collector and as a drain for the particles. The upper end of the drain annulus is open and this allows the particles to enter the drain annulus for collection in the bottom of the reactor. The drain annulus is closed at the end facing the gas inlet duct (1) in order to prevent the particle-containing gas from flowing into the drain annulus and disturbing the particle collection.

In FIGS. 2 and 3 the internal wall is placed concentric with and spaced apart from the reactor wall on three of the reactor sides. The internal wall may also be installed in parallel with only one or two of the reactor sides. The distance between the internal wall and the reactor wall is at least 5 cm and depends on the reactor size. The drain annulus formed by the internal wall and the reactor wall can have a length of 200 cm or more, for instance 1–10 m.

The number of drain pipes present in the reactor can vary, dependent on the particle content in the gas and the size of the reactor. It is possible to have from 1 to 100 drain pipes in a reactor, though a larger number is also feasible. The drain pipes have a hydraulic diameter of at least 5 cm and their length depends on the reactor size. The pipes can have a length of 200 cm or more, for instance 1–10 m.

The invention claimed is:

1. An up-flow reactor for catalytic treatment of a particle-containing gas comprising:
   at least one fixed catalytic bed;
   at least one drain pipe located upstream the fixed catalytic bed and completely within a reactor;
   a dust rectifier located downstream the drain pipe and upstream the fixed catalytic bed; and
   an outlet in communication with the reactor for collecting dust particles.

2. An up-flow reactor according to claim 1, wherein the at least one drain pipe is concentric with and spaced apart from the reactor wall.

3. An up-flow reactor according to claim 1, comprising at least two drain pipes placed equidistantly within the reactor wall.

4. An up-flow reactor according to claim 1, comprising guide vanes positioned upstream the catalytic bed.

5. An up-flow reactor according to claim 4, wherein the at least one drain pipe has the upper end being placed adjacent to the guide vanes.

* * * * *